(12) United States Patent
Ghosh

(10) Patent No.: US 11,792,108 B2
(45) Date of Patent: *Oct. 17, 2023

(54) DYNAMIC AUTO-ROUTING AND LOAD BALANCING FOR COMMUNICATION SYSTEMS

(71) Applicant: Bank of America Corporation, Charlotte, NC (US)

(72) Inventor: Asim Kumar Ghosh, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 314 days.

This patent is subject to a terminal disclaimer.

(21) Appl. No.: 17/245,710

(22) Filed: Apr. 30, 2021

(65) Prior Publication Data

US 2022/0353172 A1 Nov. 3, 2022

(51) Int. Cl.
*H04L 45/02* (2022.01)
*H04L 41/0816* (2022.01)
*H04L 47/25* (2022.01)
*H04L 47/125* (2022.01)

(52) U.S. Cl.
CPC .......... *H04L 45/08* (2013.01); *H04L 41/0816* (2013.01); *H04L 47/125* (2013.01); *H04L 47/25* (2013.01)

(58) Field of Classification Search
None
See application file for complete search history.

(56) References Cited

U.S. PATENT DOCUMENTS

| | | | |
|---|---|---|---|
| 4,337,376 A | 6/1982 | Gruenberg | |
| 4,788,721 A | 11/1988 | Krishnan et al. | |
| 4,796,363 A | 1/1989 | Rutter et al. | |
| 4,905,233 A | 2/1990 | Cain et al. | |

(Continued)

FOREIGN PATENT DOCUMENTS

| | | |
|---|---|---|
| EP | 0886403 A1 | 12/1998 |
| EP | 10066694 A2 | 6/2000 |

OTHER PUBLICATIONS

Ghosh, A. K. "Communication Analysis for Dynamic Auto-Routing and Load Balancing," U.S. Appl. No. 17/245,776, filed Apr. 30, 2021, 29 pages.

(Continued)

*Primary Examiner* — Mariela Vidal Carpio

(57) ABSTRACT

A system that includes a data source, a plurality of network devices, a routing device, and a network analysis device. The network analysis device is configured to obtain metric information that is associated with a plurality of messages and to input the metric information into a first machine learning model that outputs a traffic volume classification based on the metric information. The network analysis device is further configured to obtain bandwidth information that is associated with the plurality of network devices and to input the bandwidth information and the traffic volume classification into a second machine learning model that outputs routing recommendations based on the bandwidth information and the traffic volume classification. The network analysis device is further configured to generate routing instructions based on the routing recommendations and to reconfigure the routing device based on the routing instructions.

19 Claims, 3 Drawing Sheets

(56) References Cited

U.S. PATENT DOCUMENTS

| | | | |
|---|---|---|---|
| 4,991,204 A | 2/1991 | Yamamoto et al. | |
| 5,218,676 A | 6/1993 | Ben-Ayed et al. | |
| 5,361,334 A | 11/1994 | Cawley | |
| 5,517,620 A | 5/1996 | Hashimoto et al. | |
| 5,579,307 A | 11/1996 | Richetta et al. | |
| 5,583,990 A | 12/1996 | Birrittella et al. | |
| 5,596,722 A | 1/1997 | Rahnema | |
| 5,634,011 A | 5/1997 | Auerbach et al. | |
| 5,675,582 A | 10/1997 | Hummel et al. | |
| 5,694,545 A | 12/1997 | Roskowski et al. | |
| 5,717,862 A | 2/1998 | Annapareddy et al. | |
| 5,742,499 A | 4/1998 | Reynolds | |
| 5,931,914 A | 8/1999 | Chiu | |
| 6,016,306 A | 1/2000 | Le Boudec et al. | |
| 6,055,564 A | 4/2000 | Phaal | |
| 6,067,526 A | 5/2000 | Powell | |
| 6,192,413 B1 | 2/2001 | Lee et al. | |
| 6,216,174 B1 | 4/2001 | Scott et al. | |
| 6,275,470 B1 | 8/2001 | Ricciulli | |
| 6,418,477 B1 | 7/2002 | Verma | |
| 6,643,269 B1 | 11/2003 | Fan et al. | |
| 6,658,485 B1 | 12/2003 | Baber et al. | |
| 6,674,720 B1 | 1/2004 | Passint et al. | |
| 7,457,290 B1 | 11/2008 | Salama et al. | |
| 8,730,961 B1 | 5/2014 | Wong | |
| 8,887,205 B1* | 11/2014 | Schecter | H04N 21/44209 725/65 |
| 8,949,328 B2 | 2/2015 | Archer et al. | |
| 9,021,131 B2 | 4/2015 | Ross | |
| 9,426,099 B2 | 8/2016 | Yoshida et al. | |
| 9,544,364 B2 | 1/2017 | Jalan et al. | |
| 9,654,383 B2 | 5/2017 | Babiarz et al. | |
| 9,923,798 B1* | 3/2018 | Bahadur | H04L 45/24 |
| 9,942,152 B2 | 4/2018 | Jalan et al. | |
| 9,954,899 B2 | 4/2018 | Chen et al. | |
| 9,992,107 B2 | 6/2018 | Jalan et al. | |
| 10,038,693 B2 | 7/2018 | Jalan et al. | |
| 10,491,748 B1 | 11/2019 | Wu et al. | |
| 11,640,400 B2* | 5/2023 | Gladwin | G06F 16/24545 707/719 |
| 2003/0189930 A1 | 10/2003 | Terrell et al. | |
| 2004/0085928 A1 | 5/2004 | Chari et al. | |
| 2005/0007997 A1 | 1/2005 | Morton et al. | |
| 2005/0249116 A1 | 11/2005 | Anderson | |
| 2006/0168263 A1 | 7/2006 | Blackmore | |
| 2006/0282546 A1 | 12/2006 | Reynolds et al. | |
| 2007/0091867 A1 | 4/2007 | Derou-Madeline et al. | |
| 2007/0129980 A1 | 6/2007 | Barros | |
| 2007/0130363 A1 | 6/2007 | Barros | |
| 2008/0123532 A1* | 5/2008 | Ward | H04L 47/125 370/238 |
| 2013/0007245 A1* | 1/2013 | Malik | H04L 41/0816 709/223 |
| 2014/0006593 A1* | 1/2014 | Sarawat | H04L 61/00 709/224 |
| 2015/0039723 A1* | 2/2015 | Williams | H04L 1/0071 709/217 |
| 2017/0230279 A1* | 8/2017 | Mozolewski | H04L 45/26 |
| 2018/0006962 A1* | 1/2018 | Barth | H04L 47/20 |
| 2019/0340155 A1* | 11/2019 | Brewer | G06F 9/3851 |
| 2020/0394540 A1* | 12/2020 | Ochiai | G06N 20/00 |
| 2021/0204300 A1* | 7/2021 | Hu | H04J 3/1694 |
| 2021/0266768 A1* | 8/2021 | Siripurapu | H04L 69/18 |
| 2021/0294797 A1* | 9/2021 | Gupta | G06N 20/00 |
| 2021/0328897 A1* | 10/2021 | Sridhar | H04L 43/0888 |
| 2022/0247797 A1* | 8/2022 | Leduc | H04L 12/1822 |

OTHER PUBLICATIONS

Ghosh, A. K. "Communication System With Auto-Routing and Load Balancing," U.S. Appl. No. 17/245,854, filed Apr. 30, 2021, 29 pages.

* cited by examiner

DYNAMIC AUTO-ROUTING AND LOAD BALANCING FOR COMMUNICATION SYSTEMS

TECHNICAL FIELD

The present disclosure relates generally to communication systems, and more specifically to dynamic auto-routing and load balancing for communication systems.

BACKGROUND

In a computer network, data is routinely being processed and transferred between different network devices. As a network device receives information over time, the network device's memory resources (e.g. available disk space) are gradually consumed and reduced. Eventually, the network device's memory resource may become so low that the network device is no longer able to receive or store new data from other network devices. In existing systems, data transmissions begin to fail when the receiving network device has an insufficient amount of memory resources available. As data transfer begins to fail, a bottleneck is formed as other network devices continue to try to send data to the network device that is low on memory resources. This bottleneck reduces the flow of data through a communication system which degrades the throughput and performance of the system and may cause the system to come to a halt.

SUMMARY

The system disclosed in the present application provides a technical solution to the technical problems discussed above by leveraging machine learning to dynamically route and reroute messages within a network based on the current volume messages that need to be processed and the current bandwidth of the receiving network devices. The disclosed system provides several practical applications and technical advantages which include a process for dynamically routing and load balancing data traffic within a network to improve the resource utilization of the network devices within the network. This process ensures that network devices do not become overloaded by spikes or increases in the volume of message traffic that is transmitted within the network. By improving resource utilization, the communication system is able to prevent bottlenecks caused by overloaded network devices in the network. Improving resource utilization also reduces the amount of time that network devices within the communication system are occupied since data can be processed at a greater rate and more efficiently. By reducing the amount of time that the communication system's resources are used, the communication system is able to increase the bandwidth and throughput of the communication system. This means that the communication system is able to handle a larger volume of messages without requiring additional resources.

In one embodiment, the communication system comprises a data source, a plurality of network devices, a routing device, and a network analysis device. The network analysis device obtains metric information that is associated with a plurality of messages that are to be transmitted by the data source to the network devices. The network analysis device inputs the metric information into a first machine learning model that is configured to output a traffic volume classification based on the metric information. The traffic volume classification identifies a level of message activity that is associated with a particular entity. The network analysis device then obtains bandwidth information that is associated with the network devices and inputs the bandwidth information and the traffic volume classification into a second machine learning model. The second machine learning model is configured to output routing recommendations based on the bandwidth information and the traffic volume classification. The network analysis device generates routing instructions based on the routing recommendations and then reconfigures the routing device based on the routing instructions.

In another embodiment, the communication system comprises a network analysis device that is configured to obtain metric information that is associated with a plurality of messages and to input the metric information into a first machine learning model that outputs a traffic volume classification based on the metric information. The network analysis device is further configured to obtain bandwidth information that is associated with a plurality of network devices and to input the bandwidth information and the traffic volume classification into a second machine learning model that outputs routing recommendations based on the bandwidth information and the traffic volume classification. The network analysis device is further configured to generate routing instructions based on the routing recommendations and to reconfigure a routing device based on the routing instructions.

In another embodiment, the communication system comprises a network analysis device that is configured to obtain a traffic volume classification that is associated with a plurality of messages and bandwidth information that is associated with a plurality of network devices. The network analysis device is further configured to input the bandwidth information and the traffic volume classification into a machine learning model that outputs routing recommendations based on the bandwidth information and the traffic volume classification. The network analysis device is further configured to generate routing instructions based on the routing recommendations and to reconfigure a routing device based on the routing instructions.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
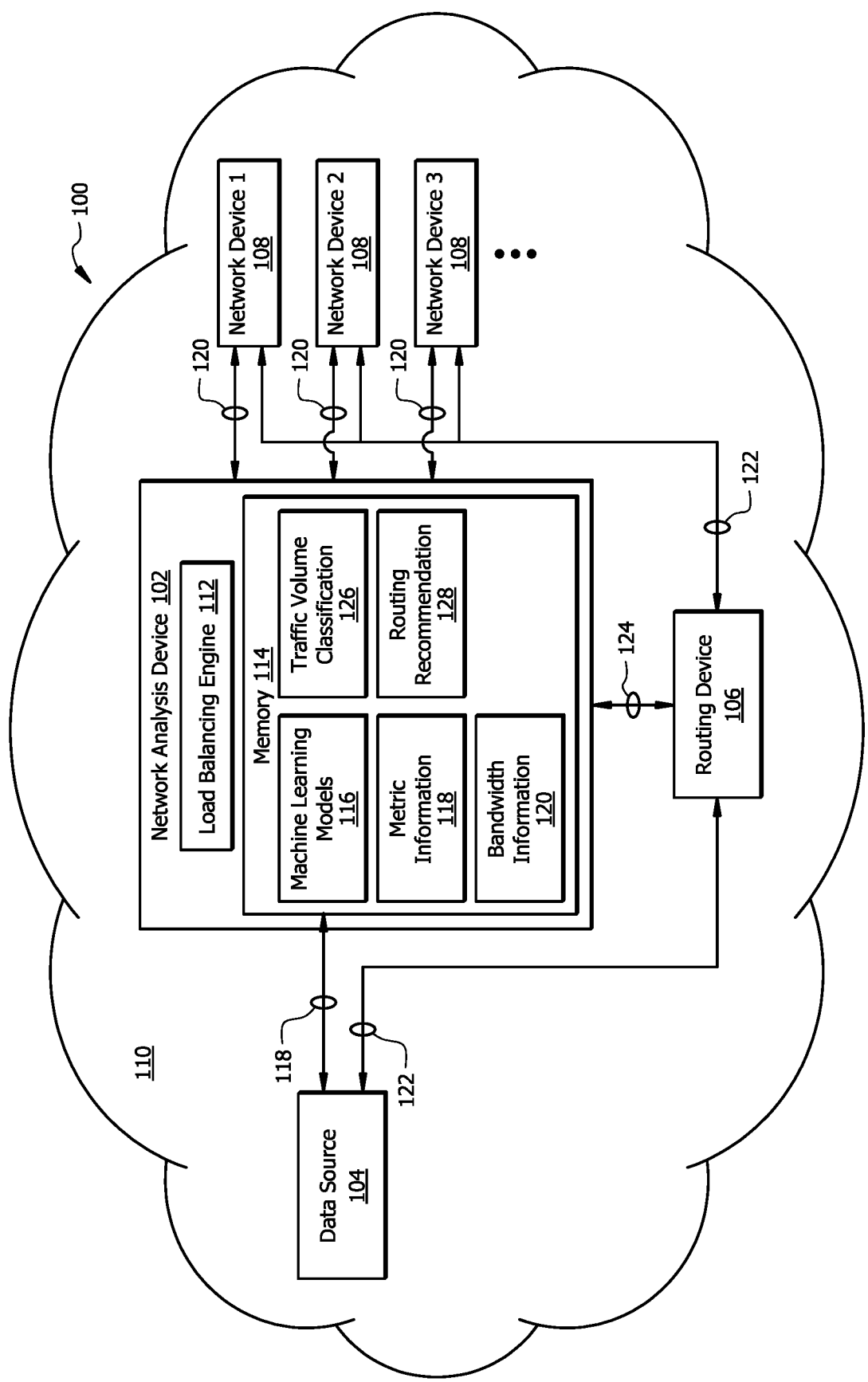
FIG. 1 is a schematic diagram of an embodiment of a communication system that is configured to employ dynamic routing and load balancing.

FIG. 1 is a schematic diagram of an embodiment of a communication system 100 that is configured to employ dynamic routing and load balancing. The communication system 100 is generally configured to dynamically route and load balance messages 122 that are transmitted between a data source 104 and a plurality of network devices 108 within a network 110. The communication system 100 is configured to actively monitor the volume of message 122 traffic that is associated with various entity identifiers and to dynamically route messages 122 associated with the entity identifiers to optimize the throughput and resource utilization of the network 110. This process ensures that network devices 108 do not become overloaded by spikes or increases in the volume of message traffic that is transmitted within the network 110. By improving resource utilization, the communication system 100 is able to prevent bottlenecks caused by overloaded network devices 108 in the network 110. Improving resource utilization also reduces the amount of time that network devices 108 within the communication system 100 are occupied since data can be processed at a greater rate and more efficiently. This means that the communication system 100 is able to handle a larger volume of messages 122 without requiring additional resources.

In one embodiment, the communication system 100 comprises a network analysis device 102, one or more data sources 104, one or more routing devices 106, and a plurality of network devices 108 that are in signal communication with each other over a network 110. The network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 110 may be configured to support any suitable type of communication protocol as would be appreciated by one of ordinary skill in the art.

Data Sources

Examples of data sources 104 include, but are not limited to, databases, memories, servers, file repositories, computing devices, trading platform devices, or any other suitable type of device. In FIG. 1, the communication system 100 shows a single data source 104. In other embodiments, the communication system 100 may comprise any other suitable number of data sources 104. Data source 104 may be in signal communication with the network analysis device 102 and the routing device 106 using any suitable type of wired or wireless connection and/or communication protocol. The data source 104 is configured to send messages 122 to the network devices 108 via the routing device 106. The data source 104 is also configured to send metric information 118 to the network analysis device 102. The metric information 118 generally comprises information about the volume of message traffic to be transmitted for a plurality of entities. Examples of entities include, but are not limited to, businesses, organizations, and individuals. In one embodiment, the metric information 118 comprises a metric identifier, an entity identifier, a message count, and transaction information. The metric identifier comprises an alphanumeric value that uniquely identifies the instance of metric information 118. The entity identifier comprises an alphanumeric value that uniquely identifies an entity. For example, the entity identifier may be a name, symbol, or code that uniquely identifies an entity. The message count identifies a total number of messages 122 associated with an entity identifier that has been received within a predetermined time interval. The transaction information may comprise an order number, order request details, or any other suitable type of information associated with an order. In other examples, the metric information 118 may comprise any other suitable type or combination of information.

In one embodiment, the data source 104 may be configured to periodically send messages 122 and metric information 118. For example, the data source 104 may be configured to send messages 122 and/or metric information 118 at predetermined time intervals (e.g. hourly or daily). In other embodiments, the data source 104 may be configured to send messages 122 and/or metric information 118 in response to a data requests from the routing device 106 and the network analysis device 102, respectively.

Network Devices

In one embodiment, a network device 108 may be a physical hardware device, for example a computing device. In other embodiments, a network device 108 may be a virtual machine or virtual device. Examples of network devices 108 include, but are not limited to, a computer, a server, a virtual machine, a database, or any other suitable type of network device. A network device 108 is generally configured to receive and process messages 122 from the data source 104. For example, a message 122 may be an email, data for processing, an order request, a transaction request, or any other suitable type of data. Each network device 108 is further configured to send bandwidth information 120 to the network analysis device 102. The bandwidth information 120 identifies an amount of messages 122 that have been received by a network device 108. In some embodiments, the bandwidth information 120 may identify an amount of messages 122 that have been received for a particular entity identifier.

Routing Device

Examples of the routing device 106 include, but are not limited to, a router, a server, a computer, or any other suitable type of network device. The routing device 106 is a hardware device that is generally configured to route messages 122 from the data source 104 to the network devices 108. As an example, the routing device 106 may be a software-defined networking (SDN) device that allows that routing device 106 to be reconfigurable. The routing device 106 may comprise reconfigurable hardware and/or software settings for routing messages 122 from the data source 104 to a particular network device 108. The routing device 106 may reconfigure its settings in response to routing instructions 124 from the network analysis device 102. An example of reconfiguring the routing device 106 is described in FIG. 2.

Network Analysis Device

Examples of the network analysis device 102 include, but are not limited to, a server, a database, a computer, or any other suitable type of network device. In one embodiment, the network analysis device 102 comprises a load balancing engine 112 and a memory 114. Additional details about the hardware configuration of the network analysis device 102 are described in FIG. 3. The memory 114 is configured to store machine learning models 116, metric information 118, bandwidth information 120, and/or any other suitable type of data.

The load balancing engine 112 is generally configured to receive metric information 118 and bandwidth information 120 and to generate routing instructions 124 for the routing device 106 based on the provided metric information 118 and bandwidth information 120. The routing instructions 124 comprise instructions or commands for configuring the routing device 106 on how to route messages 122 that are associated with a particular entity identifier to a network device 108. An example of the load balancing engine 112 in operation is described in more detail below in FIG. 2.

Examples of machine learning models 116 include, but are not limited to, a multi-layer perceptron, a recurrent neural network (RNN), an RNN long short-term memory (LSTM), or any other suitable type of neural network model. In one embodiment, the machine learning models 116 comprise a first machine learning model 116 that is generally configured to receive metric information 118 as an input and to output a traffic volume classification 126 based on the provided metric information 118. The traffic volume classification 126 identifies a level of message activity that is associated with a particular entity identifier. As an example, a traffic volume classification 126 may indicate message activity as "below normal," "normal," "slightly above normal," or "extremely high." In other examples, the traffic volume classification 126 may use any other suitable type of label for indicating a level of message activity. In some embodiments, the traffic volume classification 126 may also be associated with a numeric value that corresponds with the level of message activity. For example, the traffic volume classification 126 may be associated with a numeric value that is proportional to the level of message activity. The first machine learning model 116 is trained using training data that comprises different types of metric information 118. During the training process, the first machine learning model 116 determines weights and bias values that allow the first machine learning model 116 to map certain types of metric information 118 to different levels of message activity. Through this process, the first machine learning model 116 is able to identify a volume of network traffic activity for an entity identifier based on its metric information 118.

The machine learning models 116 may further comprise a second machine learning model 116 that is generally configured to receive bandwidth information 120 and a traffic volume classification 126 and to output routing recommendations 128 based on the provided bandwidth information 120 and traffic volume classification 126. The routing recommendations 128 comprise instructions for routing messages 122 that are associated with a particular entity identifier. The second machine learning model 116 is trained using training data that comprises information about different types of bandwidth information 120 and traffic volume classifications 126. During the training process, the second machine learning model 116 determines weights and bias values that allow the second machine learning model 116 to map certain types of bandwidth information 120 and traffic volume classifications 126 to routing recommendations 128. Through this process, the second machine learning model 116 is able to identify how to identify optimal routing recommendations 128 based on bandwidth information 120 and traffic volume classifications 126.

In some embodiments, the functionality of the first machine learning model 116 may be combined with the functionality of the second machine learning model 116 into a single machine learning model 116 that is configured to receive metric information 118 and bandwidth information 120 as an input and to output routing recommendations 128 based on the provided metric information 118 and bandwidth information 120. The load balancing engine 112 may be configured to train the machine learning models 116 using any suitable technique as would be appreciated by one of ordinary skill in the art. In some embodiments, the machine learning models 116 may be stored and/or trained by a device that is external from the network analysis device 102.

Dynamic Routing and Load Balancing Process

Figure 2:
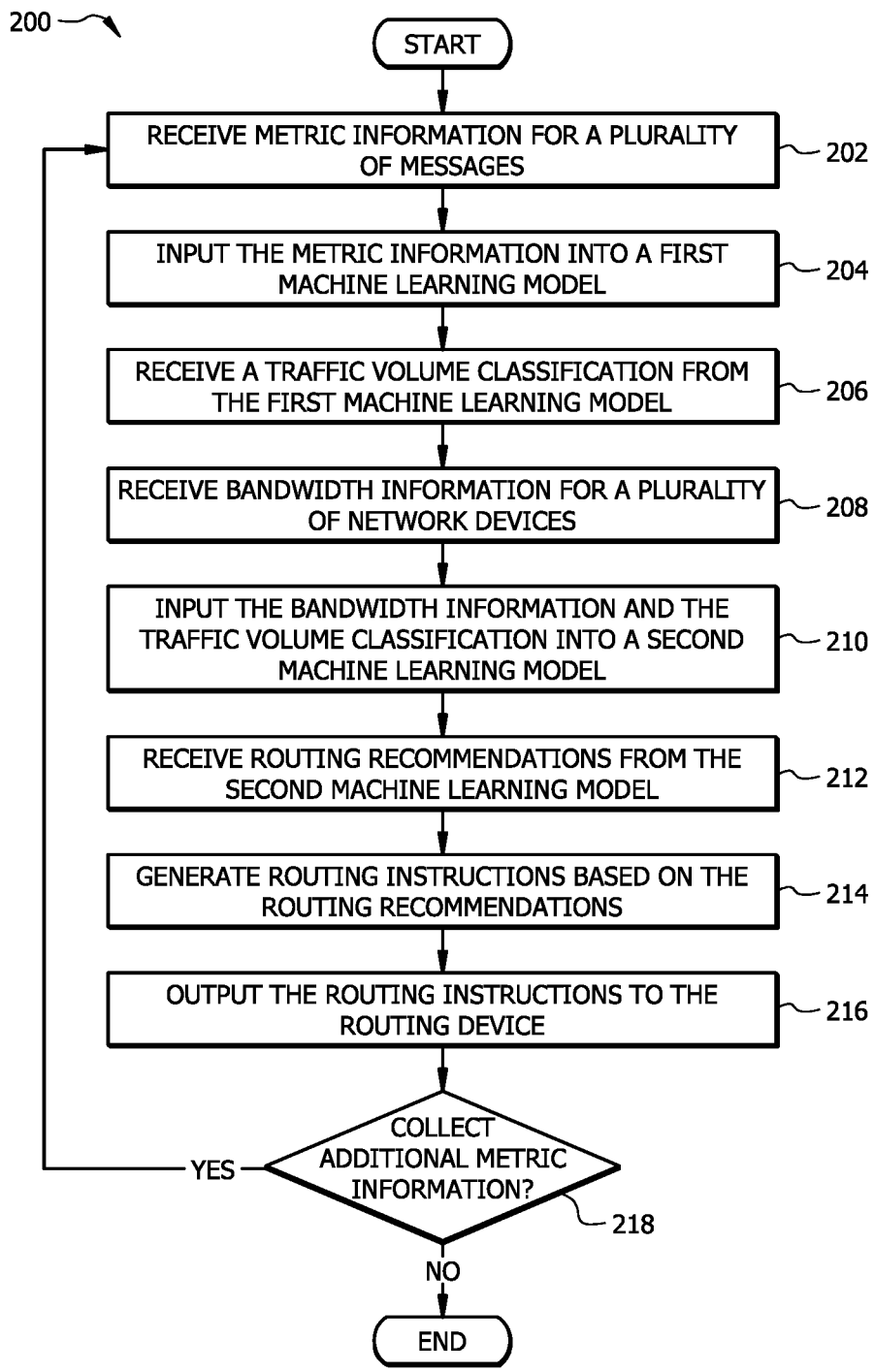
FIG. 2 is a flowchart of an embodiment of a routing process for the communication system.

FIG. 2 is a flowchart of an embodiment of a routing process 200 for a communication system 100. The communication system 100 may employ process 200 to dynamically route and load balance messages 122 that are transmitted between the data source 104 and the network devices 108. The communication system 100 is configured to actively monitor the volume of message traffic that is associated with various entity identifiers and to dynamically route messages 122 associated with the entity identifiers to optimize the throughput and resource utilization of the network 110.

At step 202, the network analysis device 102 receives metric information 118 for a plurality of messages 122. The metric information 118 comprises information that is associated with a plurality of entity identifiers. As an example, the metric information 118 may comprise a message count that identifies a total number of messages 122 that are associated with a first entity identifier that has been received within a predetermined time interval. The predetermined time interval may be five minutes, thirty minutes, one hour, twelve hours, twenty-four hours, or any other suitable period of time. In other examples, the metric information 118 may comprise transaction information or any other suitable type of information that is associated with the first entity identifier.

At step 204, the network analysis device 102 inputs the metric information 118 into the first machine learning model 116. The first machine learning model 116 was previously trained to map certain types of metric information 118 to traffic volume classifications 126.

At step 206, the network analysis device 102 receives a traffic volume classification 126 from the first machine learning model 116 based on the provided metric information 118. In response to inputting the metric information 118 into the first machine learning model 116, the network analysis device 102 obtains a traffic volume classification 126 that is associated with the first entity identifier. The traffic volume classification 126 identifies a level of message activity that is associated with the first entity identifier based on the provided metric information 118 that is associated with the first entity identifier. For example, a traffic volume classification 126 may indicate message activity for the entity identifier as "below normal," "normal," "slightly above normal," or "extremely high." In this example, the traffic volume classification 126 may also be associated with a numeric value that indicates the level of message activity.

At step 208, the network analysis device 102 receives bandwidth information 120 for a plurality of network devices 108. The bandwidth information 120 identifies an amount of messages 122 that have been received by each network device 108 within a predetermined time interval. The predetermined time interval may be five minutes, thirty minutes, one hour, twelve hours, twenty-four hours, or any other suitable period of time.

At step 210, the network analysis device 102 inputs the bandwidth information 120 and the traffic volume classification 126 into the second machine learning model 116. The second machine learning model 116 was previously trained to map certain types of bandwidth information 120 and traffic volume classifications 126 to routing recommendations 128.

At step 212, the network analysis device 102 receives routing recommendations 128 from the second machine learning model 116. In response to inputting the bandwidth information 120 and the traffic volume classification 126 into the second machine learning model 116, the network analysis device 102 obtains routing recommendations 128.

The routing recommendation 128 identifies one or more network devices 108 that are available to receive messages 122 that are associated with the entity identifier. In some embodiments, the second machine learning model 116 may be configured to generate a routing recommendation 128 for maintaining the current routing configuration for the routing device 106 when the traffic volume classification 126 indicates that the volume of messages 122 associated with the entity identifier is within an acceptable tolerance range. For example, the second machine learning model 116 may be configured to compare the traffic volume classification 126 to a predetermined threshold value, or a set of predetermined traffic volume classification 126 labels, to determine whether the traffic volume classification 126 indicates that the volume of messages 122 exceeds an acceptable tolerance range. For instance, the second machine learning model 116 may determine that the traffic volume classification 126 indicates that the volume of messages 122 is within an acceptable tolerance range when the numeric value of the traffic volume classification 126 is less than a predetermined threshold value. As another example, the second machine learning model 116 may determine that the traffic volume classification 126 indicates that the volume of messages 122 is within an acceptable tolerance range when the traffic volume classification 126 label matches a status of "normal" or "below normal." Alternatively, the machine learning model 116 may determine that the traffic volume classification 126 indicates that the volume of messages 122 exceeds the acceptable tolerance range when the traffic volume classification 126 label matches a status of "slightly above normal" or "extremely high." When the traffic volume classification 126 indicates that the volume of messages 122 is within an acceptable tolerance range, the second machine learning model 116 may output a routing recommendation 128 to maintain a current routing configuration for the routing device 106.

When the traffic volume classification 126 indicates that the volume of messages 122 exceeds the acceptable tolerance range, the second machine learning model 116 may output a routing recommendation 128 that involves the lowest impact or fewest number of changes on the routing device 106. For example, the second machine learning model 116 may determine a current routing configuration for the routing device 106 and then determine the fewest number of hardware and/or software setting changes to reroute messages 122 associated with the entity identifier to a target network device 108 that has available bandwidth and capacity. The second machine learning model 116 will then output a routing recommendation 128 that identifies the suggested setting changes for the routing device 106.

At step 214, the network analysis device 102 generates routing instructions 124 based on the routing recommendation 128. The routing instructions 124 comprise instructions for the routing device 106 about how to route messages 122 that are associated with the entity identifier to a particular network device 108. In one embodiment, the network analysis device 102 generates routing instructions 124 based on the routing recommendation 128 that involves the fewest number of changes from the current configuration of the routing device 106. For example, the network analysis device 102 may query the routing device 106 for a current routing configuration for the routing device 106. The network analysis device 102 may then identify differences between the current routing configuration of the routing device 106 and the routing recommendations 128 from the second machine learning model 116. The network analysis device 102 may then identify a routing recommendation 128 from among the routing recommendations 128 that comprises the fewest number of changes from the current routing configuration. The network analysis device 102 may then generate routing instructions 124 that correspond with the identified routing recommendation 128.

At step 216, the network analysis device 102 outputs the routing instructions 124 to the routing device 106. The network analysis device 102 outputs the routing instructions 124 to reconfigure the routing device 106 based on the routing instructions 124. The network analysis device 102 may output the routing instructions using Application Programming Interfaces (APIs) or any other suitable technique. The routing instructions 124 may identify a particular network device 108 and comprise instructions for modifying software and/or hardware settings for the routing device 106 to route messages 122 associated with the entity identifier to the identified network device 108. In one embodiment, the routing device 106 applies the received routing instructions 124 into its memory routing logic cache to implement the routing instructions 124. After outputting the routing instructions 124 to the routing device 106, the routing device 106 is reconfigured to reroute messages 122 associated with the entity identifier from a current network device 108 to the identified network device 108. In some embodiments, the routing device 106 may be further configured to reroute existing messages 122 for the identified network device 108 to a different network device 108 to provide additional bandwidth and capacity for new messages 122 that are associated with the entity identifier. In some embodiments, the routing device 106 may be further configured to block messages 122 that are not associated with the entity identifier from being transmitted to the identified network device 108. After reconfiguring the routing device 106, the network analysis device 102 may repeat steps 204-216 for any other entity identifiers that are associated with the metric information 118 that was obtained in step 202.

At step 218, the network analysis device 102 determines whether to collect additional metric information 118 for processing. In one embodiment, the network analysis device 102 may be configured to periodically collect additional metric information 118. For example, the network analysis device 102 may be configured to collect additional metric information 118 every thirty minutes, every hour, every two hours, or at any other suitable time interval. In this case, the network analysis device 102 may remain at step 218 until the predetermined time interval has elapsed. In some embodiments, the network analysis device 102 may be configured to collect additional metric information 118 on demand. In this case, the network analysis device 102 checks whether any commands or instructions have been received to collect additional metric information 118. The network analysis device 102 returns to step 202 in response to determining to collect additional metric information 118. In this case, the network analysis device 102 returns to step 202 to collect additional metric information 118 to process. Otherwise, the network analysis device 102 terminates process 200.

Hardware Configuration for a Network Analysis Device

Figure 3:
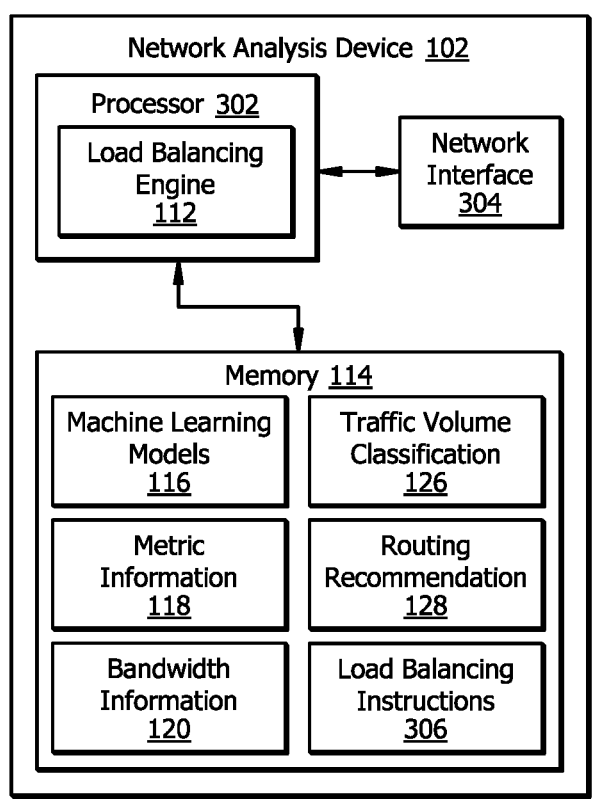
FIG. 3 is an embodiment of a network analysis device configured to employ dynamic routing and load balancing for the communication system.

FIG. 3 is an embodiment of a network analysis device 102 of a communication system 100. As an example, the network analysis device 102 comprises a processor 302, a memory 114, and a network interface 304. The network analysis device 102 may be configured as shown or in any other suitable configuration.

Processor

The processor 302 comprises one or more processors operably coupled to the memory 114. The processor 302 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 114 and the network interface 304. The one or more processors are configured to process data and may be implemented in hardware or software. For example, the processor 302 may be 8-bit, 16-bit, 32-bit, 64-bit, or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute load balancing instructions 306 to implement the load balancing engine 112. In this way, processor 302 may be a special-purpose computer designed to implement the functions disclosed herein. In an embodiment, the load balancing engine 112 is implemented using logic units, FPGAs, ASICs, DSPs, or any other suitable hardware. The load balancing engine 112 is configured to operate as described in FIGS. 1 and 2. For example, the load balancing engine 112 may be configured to perform the steps of process 200 as described in FIG. 2.

Memory

The memory 114 is operable to store any of the information described above with respect to FIGS. 1 and 2 along with any other data, instructions, logic, rules, or code operable to implement the function(s) described herein when executed by the processor 302. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store load balancing instructions 306, machine learning models 116, metric information 118, bandwidth information 120, traffic volume classifications 126, routing recommendations 128, and/or any other data or instructions. The load balancing instructions 306 may comprise any suitable set of instructions, logic, rules, or code operable to execute the load balancing engine 112. The machine learning models 116, the metric information 118, the bandwidth information 120, traffic volume classifications 126, and routing recommendations 128 are configured similar to the machine learning models 116, the metric information 118, the bandwidth information 120, traffic volume classifications 126, and routing recommendations 128 described in FIGS. 1-2, respectively.

Network Interface

The network interface 304 is configured to enable wired and/or wireless communications. The network interface 304 is configured to communicate data between data sources 104, routing devices 106, network devices 108, and other devices, systems, or domains. For example, the network interface 304 may comprise a near-field communication (NFC) interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 302 is configured to send and receive data using the network interface 304. The network interface 304 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A communication system, comprising:
   a plurality of network devices;
   a router configured to route messages from a data source to the plurality of network devices; and
   a processor in signal communication with the router and the plurality of network devices, and configured to:
   obtain metric information that is associated with the plurality of messages, wherein the metric information identifies:
   entity identifier that uniquely identifies an entity; and
   a message count that identifies a total number of messages associated with the entity identifier that have been received within a predetermined time interval;
   input the metric information into a first machine learning model, wherein the first machine learning model is configured to:
   receive the metric information; and
   output a traffic volume classification based on the metric information,
   wherein the traffic volume classification identifies a level of message activity that is associated with the entity identifier;
   obtain bandwidth information that is associated with the plurality of network devices, wherein the bandwidth information identifies an amount of messages that have been received for each network device from among the plurality of network devices;

input the bandwidth information and the traffic volume classification into a second machine learning model, wherein the second machine learning model is configured to:
  receive the bandwidth information and the traffic volume classification; and
  output routing recommendations based on the bandwidth information and the traffic volume classification, wherein the routing recommendations identifies a subset of network devices from among the plurality of network devices;
generate routing instructions based on the routing recommendations, wherein the routing instructions comprise instructions for routing messages associated with the entity identifier to a first network device from among the subset of network devices; and
reconfigure the router based on the routing instructions.

2. The system of claim 1, wherein generating the routing instructions comprises:
determining a current routing configuration for the router;
identifying a first routing recommendation from among the routing recommendations with the fewest number changes from the current routing configuration; and
generating the routing instructions based on the first routing recommendation.

3. The system of claim 1, wherein reconfiguring the router comprises sending the routing instructions to the router.

4. The system of claim 3, wherein sending the routing instructions modifies one or more software settings on the router.

5. The system of claim 3, wherein sending the routing instructions modifies one or more hardware settings on the router.

6. The system of claim 1, wherein the second machine learning model is configured to:
compare the traffic volume classification to a predetermined threshold value;
determine that the traffic volume classification is below the predetermined threshold value;
determine a current routing configuration for the router; and
output a first routing recommendation that corresponds with the current routing configuration.

7. The system of claim 1, wherein the second machine learning model is configured to:
compare the traffic volume classification to a predetermined threshold value;
determine that the traffic volume classification exceeds the predetermined threshold value;
determine a current routing configuration for the router;
identify one or more setting changes from the current routing configuration; and
output a first routing recommendation that comprises the one or more setting changes from the current routing configuration.

8. The system of claim 1, wherein reconfiguring the router comprises rerouting messages associated with the entity identifier from a first network device to a second network device.

9. The system of claim 8, wherein reconfiguring the router blocks messages that are not associated with the entity identifier from being sent to the second network device.

10. The system of claim 8, wherein reconfiguring the router comprises rerouting messages that are not associated with the entity identifier from the second network device to a third network device.

11. A routing method, comprising:
obtaining metric information that is associated with a plurality of messages, wherein the metric information identifies:
  entity identifier that uniquely identifies an entity; and
  a message count that identifies a total number of messages associated with the entity identifier that have been received within a predetermined time interval;
inputting the metric information into a first machine learning model, wherein the first machine learning model is configured to:
  receive the metric information; and
  output a traffic volume classification based on the metric information, wherein the traffic volume classification identifies a level of message activity that is associated with the entity identifier;
obtaining bandwidth information that is associated with a plurality of network devices, wherein the bandwidth information identifies an amount of messages that have been received for each network device from among the plurality of network devices;
inputting the bandwidth information and the traffic volume classification into a second machine learning model, wherein the second machine learning model is configured to:
  receive the bandwidth information and the traffic volume classification; and
  output routing recommendations based on the bandwidth information and the traffic volume classification, wherein the routing recommendations identifies a subset of network devices from among the plurality of network devices;
generating routing instructions based on the routing recommendations, wherein the routing instructions comprise instructions for routing messages associated with the entity identifier to a first network device from among the subset of network devices; and
reconfiguring a router based on the routing instructions by sending the routing instructions to the router.

12. The method of claim 11, wherein generating the routing instructions comprises:
determining a current routing configuration for the router;
identifying a first routing recommendation from among the routing recommendations with the fewest number changes from the current routing configuration; and
generating the routing instructions based on the first routing recommendation.

13. The method of claim 11, wherein sending the routing instructions modifies one or more software settings on the router.

14. The method of claim 11, wherein sending the routing instructions modifies one or more hardware settings on the router.

15. The method of claim 11, wherein the second machine learning model is configured to:
compare the traffic volume classification to a predetermined threshold value;
determine that the traffic volume classification is below the predetermined threshold value;
determine a current routing configuration for the router; and
output a first routing recommendation that corresponds with the current routing configuration.

16. The method of claim 11, wherein the second machine learning model is configured to:

compare the traffic volume classification to a predetermined threshold value;
determine that the traffic volume classification exceeds the predetermined threshold value;
determine a current routing configuration for the router;
identify one or more setting changes from the current routing configuration; and
output a first routing recommendation that comprises the one or more setting changes from the current routing configuration.

17. The method of claim 11, wherein reconfiguring the router comprises rerouting messages associated with the entity identifier from a first network device to a second network device.

18. The method of claim 17, wherein reconfiguring the router blocks messages that are not associated with the entity identifier from being sent to the second network device.

19. A communication system, comprising:
a router configured to route messages from a data source to a plurality of network devices; and
a processor in signal communication with the router, and configured to:
  obtain metric information that is associated with the plurality of messages, wherein the metric information identifies:
    entity identifier that uniquely identifies an entity; and
    a message count that identifies a total number of messages associated with the entity identifier that have been received within a predetermined time interval;
  input the metric information into a first machine learning model, wherein the first machine learning model is configured to:
    receive the metric information; and
    output a traffic volume classification based on the metric information,
  wherein the traffic volume classification identifies a level of message activity that is associated with the entity identifier;
  obtain bandwidth information that is associated with the plurality of network devices, wherein the bandwidth information identifies an amount of messages that have been received for each network device from among the plurality of network devices;
  input the bandwidth information and the traffic volume classification into a second machine learning model, wherein the second machine learning model is configured to:
    receive the bandwidth information and the traffic volume classification; and
    output routing recommendations based on the bandwidth information and the traffic volume classification, wherein the routing recommendations identifies a subset of network devices from among the plurality of network devices;
  generate routing instructions based on the routing recommendations, wherein the routing instructions comprise instructions for routing messages associated with the entity identifier to a first network device from among the subset of network devices; and
  reconfigure the router based on the routing instructions.

* * * * *